*R. J. Hollingsworth,*

*Soldering Machine.*

Nº 49,880.   Patented Sep. 12, 1865.

Witnesses:
Wm Crewn
Thos Tusch

Inventor:
R J Hollingsworth

UNITED STATES PATENT OFFICE.

ROBERT J. HOLLINGSWORTH, OF CINCINNATI, OHIO.

IMPROVEMENT IN SOLDERING TIN CANS.

Specification forming part of Letters Patent No. 49,880, dated September 12, 1865.

*To all whom it may concern:*

Be it known that I, ROBERT J. HOLLINGSWORTH, of Cincinnati, in the county of Hamilton and State of Ohio, have invented a new and useful Improvement in Apparatus for Soldering Tin Cans; and I do hereby declare that the following is a full, clear, and exact description thereof, which will enable those skilled in the art to make and use the same, reference being had to the accompanying drawings, forming part of this specification, in which—

Figure 1:
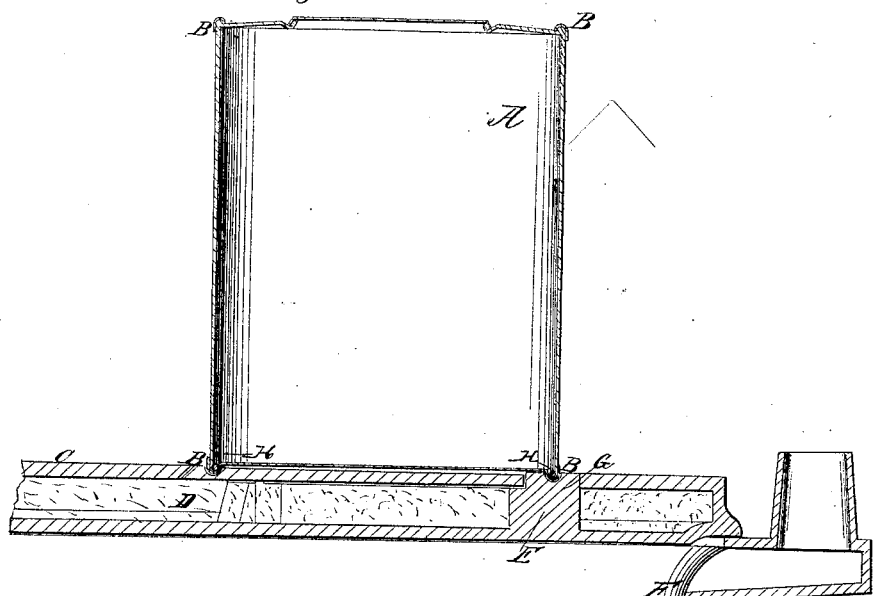
Figure 2:
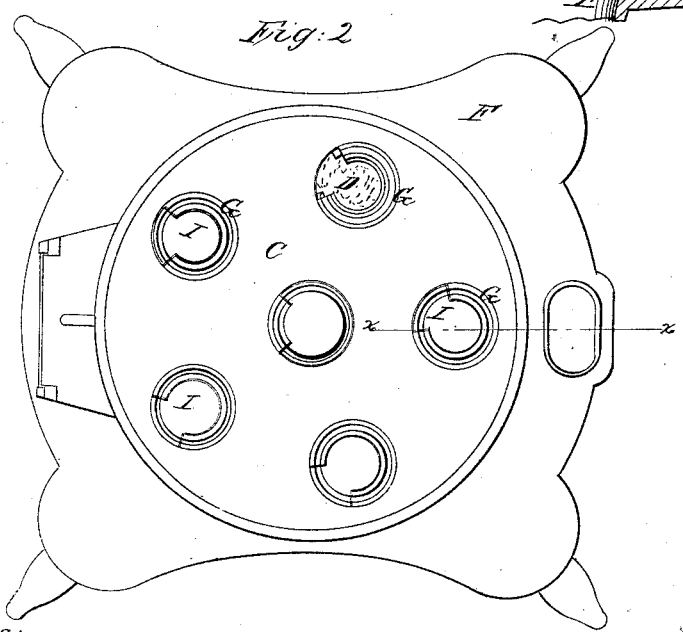

Figure 1 is an elevation of a section of a tin can whose joints are about to be soldered, and also of a section of a portion of the apparatus by means of which the soldering is effected. Fig. 2 is a plan of the said apparatus, showing also a part of the furnace on which it is placed.

Similar letters of reference indicate like parts.

The object of this invention is the soldering of the joints of tin cans—such, for instance, as fruit-cans.

It consists in the construction and manner of using a heating or soldering plate on which the can is placed, and by the communication of heat from which the solder applied in the inside of the can is melted and the joints securely soldered together.

A designates a fruit-can of the common size and shape. Its side joint or seam is soldered in the usual manner.

My invention is applied in this example to securing the joints B of the top and bottom. I form a circular groove on the inside surfaces of the top and bottom of the can, which receives the rim or edge of the body at top and bottom, and also forms a flange to come a little ways over the outside of said rims or edges, as seen in Fig. 1. In this groove in the inside of the can I lay a coil of solder-wire, H, which I melt by means of the apparatus next described, first supplying a coat of resin or its equivalent to the grooves and joints.

C designates the apparatus. It consists of a hollow plate provided with six or more grooves, G, nearly circular in form, and which are sunk to the depth of the grooves of the can. Their curves are to coincide with the lines of the grooves in the top and bottom of the can, so that the latter will fit in the grooves of the plate. Those parts of the plate which contain the grooves G are solid, as seen at E, while the remaining parts are hollow, and the hollow space is filled with any good non-conducting substance, the ashes of cannel-coal answering a good purpose. The non-conducting substance therefore surrounds the solid parts E and intervenes between the lower and upper surfaces of the plate C, so as to keep the upper surface at a low heat compared to the temperature of the solid part E, in which the grooves G occur.

The interior of the plate is got at to remove and supply the non-conducting substance by means of removable covers I, one of which is shown removed in Fig. 2. This plate is fitted upon the top of a furnace, (seen at F,) in which a fire is maintained while the apparatus is in use. When the plate is sufficiently hot for use a can previously supplied with a coil of solder-wire is placed on it, so that the groove of one of its joints B will fit in one of the grooves G of the plate. So soon as the solder begins to flow the cam is to be shifted and shook a little, so as to distribute it more perfectly around the joint. It is then taken off. Each of the grooves G is to receive a can at the same time, and since the operation takes very little time a large number of cans can be soldered in a given time. The top and bottom joints are soldered in the same way. This mode of soldering the bottom and top joints preserves the side joint or seam, which is soldered on the outside in good order without impairing it near the joints B of the top and bottom of the can, as is liable to be done in the common mode of soldering the joints B only on the outside. I also make the joints B more perfect, and my process gives more assurance than any other of an air-tight can, since I have plumber-joints on the inside of the joints B, and can have a solder joint on the outside also.

I claim as new and desire to secure by Letters Patent—

The plate C, constructed and operated substantially as described, for soldering the joints of metallic fruit-cans.

ROBERT J. HOLLINGSWORTH.

Witnesses:
J. R. SWIGART,
A. W. GRIFFITH.